Patented Feb. 23, 1932

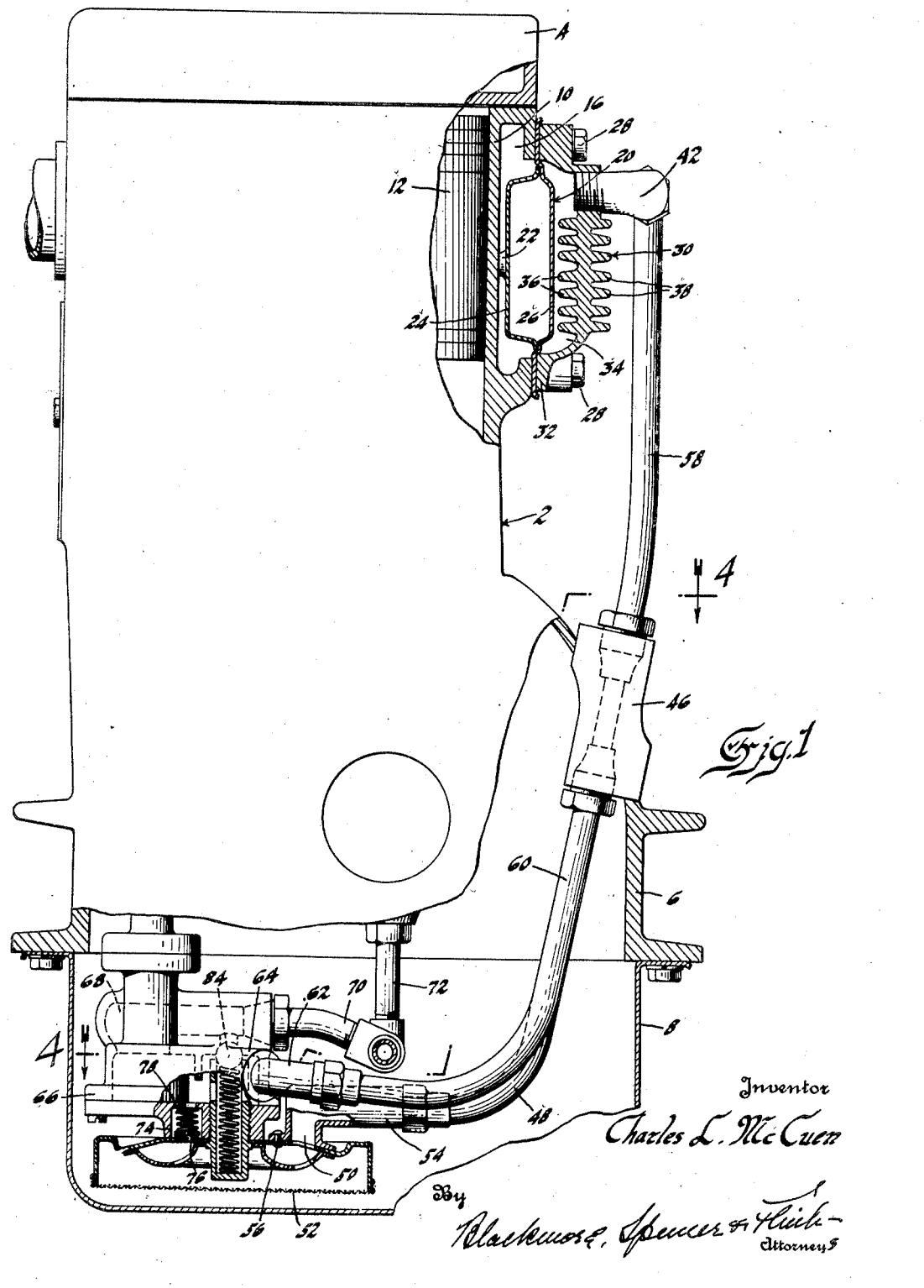

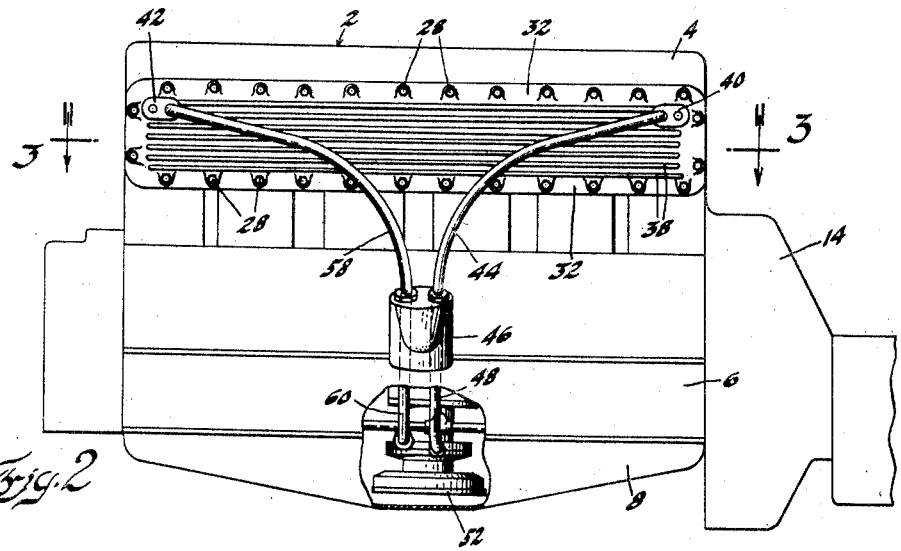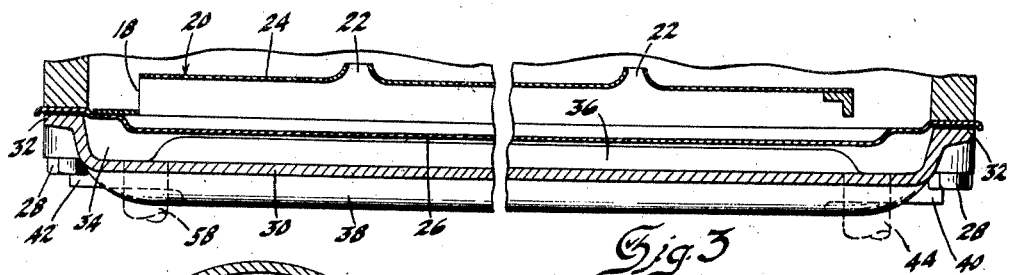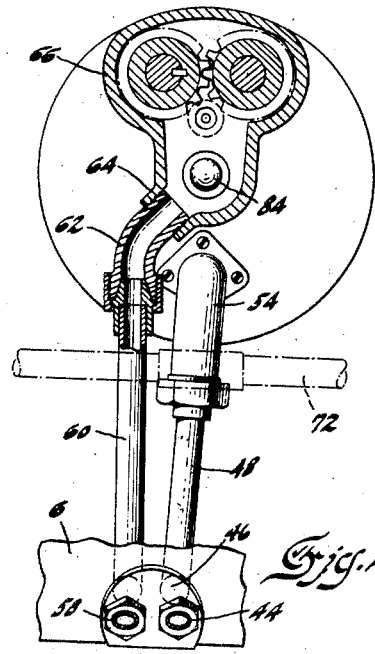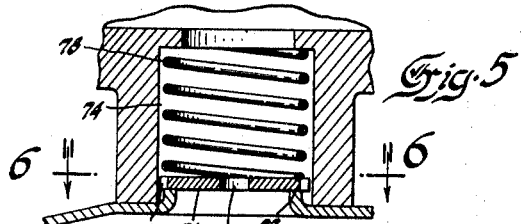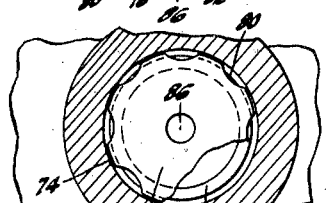

1,846,268

UNITED STATES PATENT OFFICE

CHARLES L. McCUEN, OF LANSING, MICHIGAN, ASSIGNOR TO GENERAL MOTORS CORPORATION, OF DETROIT, MICHIGAN, A CORPORATION OF DELAWARE

OIL COOLING SYSTEM

Application filed March 13, 1929. Serial No. 346,624.

This invention relates to lubricating systems and especially to a method or system of maintaining the lubricant at an efficient operating temperature, and is particularly adapted to and is illustrated in connection with the internal combustion engine of an automotive vehicle, although it is adaptable for uses in other relations.

In lubricating systems now used on internal combustion engines, of automotive vehicles, the matter of maintaining the lubricant at an efficient temperature has been somewhat of a problem and various devices have been proposed and devised for the purpose of adequately cooling the lubricant to provide against its becoming over heated and thereby interfering with the efficiency of its lubricating properties, and also for heating the lubricant when it is cold in order that it will properly flow to the working parts and avoid starving of the bearings of their supply of lubricant.

In the course of experiments conducted along the lines of lubricant cooling the disclosure of the present application was evolved. In actual practice it has been found that the device of the invention obtained a lowering of the temperature of the lubricant of about 20° when the engine is fully heated and in normal running condition. The degree of cooling will of course depend upon the size of the cooling chamber, and a greater or less amount of cooling may be obtained by enlarging or diminishing the size of the cooling chamber or by changing the size of the ribs attached to the heat dissipating member of the system. Inasmuch as the cooling is effected by the coldest water in the water circulating system, this water will effect a heating of the oil at starting, or at a time when a thinner oil is needed.

The disclosure of the invention is particularly adaptable to the engine disclosed in my prior application No. 283,901, filed June 8, 1928, in Division 28. The internal combustion engine of my prior application is substantially the same as that shown in the instant case and has a water jacket at one side which conducts the water from the pump to the engine and distributes it proportionately between the cylinders. This jacket extends the full length of the engine block and is suitably attached by means of screw bolts. The heat radiating or cooling member of the invention is shaped conformably to the shape of the jacket and has attaching openings which conform to the attaching openings of the jacket so that the same bolts which fasten the jacket are made use of in securing the heat dissipating member to the side of the engine block.

The heat dissipating member of the invention comprises an elongated dished member U-shaped in cross section having ribs on both its inner and outer sides and is spaced from the jacket so as to leave a channel therebetween. A suitable inlet pipe leads to one end of the jacket and an outlet pipe conducts the lubricant away from the opposite end, thereby forcing the oil to pass entirely along the heat dissipating member in the channel between the jacket and member.

The lubricating system is of the force feed type and is accordingly provided with an oil pump. The mouth of the inlet pipe is at the pump jacket and is adapted to receive its oil through the usual screen of the pump. The pump inlet receives the lubricant from the outlet of the cooling chamber and passes the oil in the usual way to the oil manifold for delivery to the engine bearings. The pump is provided with the usual inlet which, however, is closed by a disc valve having angular edges and a spring to hold it against its seat. If the pipe leading to the oil cooler is clogged, or if the oil is so stiff that the pump is unable to suck the lubricant through the cooling system, the disc valve will be crowded or raised against the tension of a spring, which will permit the oil to flow between the inlet walls and the angular sides of the disc valve to directly supply the pump with lubricant from the oil pan in the usual way. The disc valve is provided with a small bleed hole at its center to permit priming of the pump and to always allow a small amount of oil to enter the pump from the inlet openings.

Referring to the drawings:

Fig. 1 shows an end view of an internal combustion engine, the parts shown in section to illustrate the invention.

Fig. 2 is a side view of Fig. 1, looking from the right with a part of the oil pan and crank case broken away to illustrate the pump and the connections therewith.

Fig. 3 is a section on the line 3—3 of Fig. 2.

Fig. 4 is a section through the pump taken substantially on the line 4—4 of Fig. 1.

Fig. 5 is an enlarged detailed view of the pump inlet and valve.

Fig. 6 is a section on the line 6—6 of Fig. 5.

Referring to the drawings, the numeral 2 indicates an internal combustion engine as a whole, having a removable head 4, the crank case 6, the oil pan 8, cylinders 10, pistons 12, flywheel housing 14 and water circulating system 16, all of which are conventional and form no part of the invention except insofar as they relate to the combination.

The water circulating system is provided with the usual water pump (not shown) for circulating the water through the cooling system to cool the engine and cylinders. The water from the pump is passed into the front portion 18 of the water jacket 20 and is distributed from the openings 22 to the spaces between the cylinder walls. The jacket 20 is composed of the inner member 24 and the outer member 26, the latter of which is impervious and is rigidly secured to the engine block by means of the bolts 28. The particular construction of this water jacket is disclosed in greater detail in the copending application to which reference has previously been made.

Secured over the water jacket 20 and substantially or generally conforming to the shape of the outer member 26 is the heat dissipating member 30 of the invention. The member 30 is of metal, preferably aluminum, and is dish shaped and generally of U-shape in sectional formation but has the peripheral flange 32 which has bolt openings conforming to the openings in the outer member 26 and is secured over this member and to the engine block by the same bolts 28 which secure the water jacket. The heat dissipating element 30 is secured in liquid tight relation to the engine block over the water jacket but is spaced therefrom so as to form a relatively long channel 34 therebetween. As is best shown in Figs. 1 and 3, the heat dissipating member 30 is provided on its inner and outer sides with the ribs 36 and 38, respectively, which extend substantially the full length of the heat dissipating member 30 and serve as a means for taking the heat from the oil and passing it to the outside atmosphere.

Preferably at the right hand end as shown in Fig. 1 the member 30 is provided with an inlet 40 and at its opposite end with an outlet 42. A pipe 44 is connected at one end to the inlet and at its other end to a passage in the connection 46 mounted in the crank case. The passage has connected thereto a second pipe 48 which leads to the connection 54 having the mouth 50 positioned above the usual screen 52 of the pump. By referring to Fig. 1 it will be noted that the pipe 48 terminates in the connecting member 54 which is suitably secured to the pump by means of the rivets 56.

The outlet 42 of the heat dissipating or heat transfer member 30 has connected thereto the pipe 58 which leads to a second passage in the connection 46 in the crank case. This passage has connected thereto a second pipe 60 which terminates in the connection 62 which leads to an inlet 64 of the gear pump 66. From the pump 66 the oil is passed to the outlet 68, then to the pipe 70 and on to the oil manifold 72 to be delivered to the bearings and the working parts of the engine.

The oil pump is provided with the usual inlet 74, the mouth of which is normally closed by means of the disc valve 76 held on its seat by means of the spring 78. The disc valve 76 is provided with the annular or notched sides 80 which prevent the flow of lubricant thereby when held on its seat 82 as shown in Figs. 1 and 5. However, when the oil resistance in the cooling system is sufficiently high or when either of the pipes 60 or 48 is clogged, the suction of the pump will unseat the valve 76 and permit the lubricant to flow past the notched portions 80 toward the pump so that the bearings and working parts of the engine may at all times be assured of an adequate supply of the lubricant. During cold weather, due to the fact that the oil is in a thickened state, the pump may not be able to draw the oil through the cooling system and in such a case, it is desirable to provide some sort of means to furnish the pump with an adequate supply of lubricant and this is done by the valve arrangement shown in detail in Figs. 5 and 6. The valve 76 is also provided with a small bleed hole 86 to at all times permit a small amount of lubricant to flow directly to the pump. However, this opening is not sufficiently large to interfere with the proper functioning of the device. The pump 66 is also provided with the customary ball pressed pressure relief valve 84 to take care of the excess pressure existing in the system.

The operation of the temperature regulating or oil cooling system is as follows: When the engine is started and the pump 66 is in operation, the latter will tend to draw the lubricant in the oil pan 8 through the two inlets 64 and 74, but if the lubricant in the cooling system is in a thickened state or if the system is clogged in any way, the pump will unseat the valve 76 to draw its supply of oil in the usual way. When the viscosity of the oil is sufficiently low, or when the oil heats up due to the heat of the water in the circulating system, and the pump will then pull the oil from the pipe 60 through the lubricating system instead of from the inlet 74, the tension of the spring 78 being sufficient to hold the valve 76 on its seat. When the pump is drawing the lubricant from the inlet 64, the course of the oil will be from the screen 52 into the mouth 50 through connection 54, pipes 48 and 44, into the inlet 40 at the right hand end of the cooling system, through the passage 34 between the heat dissipating member 30 and the outer plate 26 of the water jacket 20 to the outlet 42 at the left hand end, down the pipes 58 and 60 to the connection 62, and into the inlet 64 of the pump. The pump will then force the lubricant to the outlet 68 into the pipe 70 and manifold 72 which leads to the bearings. As the oil passes from the inlet 40 to the outlet 42, it will travel across the inner ribs 36 as well as across the surface of the outer plate 26 of the water jacket 20 and cause an interchange of heat between the oil, water jacket and heat dispensing member. Inasmuch as the water delivered to the water jacket is at its coldest temperature, the tendency will be to maintain the oil at the coldest water temperature. If the oil is colder than the water, heat will be delivered to the oil by the jacket and transferred by the ribs 36 and 38 to the outside. In case the oil is hotter than the water of the circulating system the heat from the oil will be taken up by the water as well as transferred by the member 30 to the outside and a considerable lowering of the temperature of the oil will be effected.

It is obvious that the degree of cooling is dependent upon the size of the member 30 and upon the number and size of the heat dissipating ribs or flanges. A greater number of flanges and larger heat dissipating member 30 will afford a greater degree of cooling, while a smaller member will give a correspondingly less degree of cooling.

An additional advantage for the invention is that the oil is forced to travel through a narrow space in flowing from the cooler inlet 40 to the outlet 42, giving a scrubbing action and forcing the oil away from the ribs and the water jacket or manifold. This insures a fresh supply of oil always passing through the cooler.

I claim:

1. In combination with an internal combustion engine having a lubricating system, a system for maintaining the lubricant at an efficient temperature, comprising an exposed portion of the water circulating system of the engine, a heat dissipating or heat transfer member secured over said portion in liquid tight relation but having no connection with the water of the circulating system, said member and said portion of the water circulating system defining a channel therebetween, and means for delivering the lubricant into and conducting the lubricant away from the channel between said member and said portion of the system.

2. In combination with an internal combustion engine having a lubricating system, a system for maintaining the lubricant at an efficient temperature, comprising an exposed water jacket forming a portion of the water circulating system of the engine, a heat dissipating member secured over said jacket in liquid tight relation but having no connection with the water of the circulating system, said member and said jacket defining a channel therebetween, and means for delivering lubricant into and conducting it away from the channel between said member and said jacket.

3. In combination with an internal combustion engine having a lubricating system, a system for maintaining the lubricant at an efficient temperature, comprising an exposed water jacket forming a part of the water circulating system of the engine, a ribbed heat dissipating member over said jacket, and means for delivering lubricant to and conducting it away from said member.

4. In combination with an internal combustion engine having a lubricating system, a system for maintaining the lubricant at an efficient temperature, comprising an exposed portion of the water circulating system of the engine, a heat dissipating member having ribbed sides secured over said portion, and means for delivering lubricant to and conducting it away from said member.

5. In combination with an internal combustion engine having a lubricating system, a system for maintaining the lubricant at an efficient temperature, comprising a part of the water circulating system of the engine, a ribbed heat dissipating member secured over but spaced from said part to form a channel therebetween, and means for delivering lubricant to and conducting it away from said member.

6. In combination with an internal combustion engine having a lubricating system, a system for maintaining the lubricant at an efficient temperature, comprising a part of the water circulating system of the engine, a heat dissipating member secured over but spaced from said part, and means for delivering the lubricant to one end of said member and conducting it away from the other end.

7. In combination with an internal combustion engine having a lubricating system, a system for maintaining the lubricant at an efficient temperature comprising a part of the water circulating system of the engine, a heat dissipating member secured over said part in liquid tight relation but having no connection with the water of the circulating system, said member and said part of the water circulating system defining a channel therebetween, a lubricant pump, means for conducting the lubricant from the pump to the said channel, and means for returning the lubricant from the channel to the pump.

8. In combination with an internal combustion engine having a lubricating system, a system for maintaining the lubricant at an efficient temperature, comprising a part of the water circulating system of the engine, a ribbed heat dissipating member secured to said part in liquid tight relation but having no connection with the water of the circulating system, said member and said part of the water circulating system defining a channel therebetween, a pump, means for delivering lubricant from the pump to one end of said channel, and means for delivering the lubricant to the pump from the other end of said channel.

9. In combination with an internal combustion engine having a lubricating system, a system for maintaining the lubricant at an efficient temperature, comprising a member connected in the water circulating system of the engine and through which the water flows, a heat dissipating element ribbed on two sides and attached to but spaced from said element, a pump, means for delivering the lubricant to the heat dissipating element, and means for delivering the lubricant from said element to the pump.

10. In combination with an internal combustion engine having a lubricating system, a system for maintaining the lubricant at an efficient temperature, comprising an exposed part of the water circulating system at the side of the engine, a ribbed heat dissipating member secured over and conforming to but spaced from said exposed part, a pump, means for conducting the lubricant to the said member, and means for delivering the lubricant from the member to the pump.

11. In combination with an internal combustion engine having a lubricating system, a system for maintaining the lubricant at an efficient temperature, comprising a jacket in the water circulating system of the engine, a ribbed heat dissipating member conforming to and placed over but spaced from said jacket, a pump, means for conducting lubricant to the said member, and means for delivering the lubricant from the member to the pump.

12. In combination with an internal combustion engine having a lubricating system, a system for maintaining the lubricant at an efficient temperature, comprising a heat dissipating member attached to but spaced from said engine so as to form a channel therewith, a pump, means connected to the pump housing for conducting the lubricant to the member, an inlet to the pump, and means normally closing said inlet to force the oil to pass through said conducting means to the heat dissipating member, said last named means adapted to open when the lubricant is unable to pass through the system.

13. In combination with an internal combustion engine having a lubricating system, a system for maintaining the lubricant at an efficient temperature, comprising a heat dissipating member attached to but spaced from said engine so as to form a channel therewith, a pipe for delivering lubricant to the member, a pump, and means for delivering the lubricant from the member to the pump.

14. In combination with an internal combustion engine having a lubricating system, a system for maintaining the lubricant at an efficient temperature, comprising a ribbed heat dissipating element attached to but spaced from the engine so as to form a channel therewith, a pipe for conducting lubricant to the said element, a pump, and means for delivering the lubricant from the element to the pump.

15. In combination with an internal combustion engine having a lubricating system, a system for maintaining the lubricant at an efficient temperature, comprising a heat dissipating element ribbed on two sides and secured to but spaced from said engine to form a channel therewith, a pipe to conduct lubricant to said element, a pump, and a conduit for conducting the lubricant from said element to the pump.

16. In combination with an internal combustion engine having a lubricating system, a system for maintaining the lubricant at an efficient temperature, comprising a member secured to but spaced from the engine so as to form a channel therewith, inlet and outlet pipes leading to and from said member to conduct the lubricant thereto and therefrom, a pump in said outlet pipe to receive the lubricant, an inlet for said pump, a valve in said inlet normally closed to force the oil to pass into said inlet pipe, and means permitting said valve to open when the lubricant cannot pass into said inlet pipe.

17. In combination with an internal combustion engine having a lubricating system, a system for maintaining the lubricant at an efficient temperature, comprising a member secured to but spaced from the engine so as to form a channel therewith, inlet and outlet pipes leading to and from said member to conduct the lubricant thereto and therefrom, a pump in said outlet pipe to receive the lubricant, an inlet for said pump, a valve in said inlet normally closed to force the oil into said inlet pipe, means permitting said valve to open when the lubricant cannot pass into said inlet pipe, and a bleed hole in said valve to at all times permit a small quantity of lubricant to flow to the pump.

In testimony whereof I affix my signature.

CHARLES L. McCUEN.